(12) United States Patent
Orsini et al.

(10) Patent No.: US 9,561,910 B1
(45) Date of Patent: Feb. 7, 2017

(54) VERTICAL ASSEMBLY LINE

(71) Applicant: LEAR CORPORATION, Southfield, MI (US)

(72) Inventors: Frank Cracchiolo Orsini, Oakland Township, MI (US); Luis Ernesto Noe Gonzalez, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 15/018,125

(22) Filed: Feb. 8, 2016

(51) Int. Cl.
*B65G 1/00* (2006.01)
*B65G 37/00* (2006.01)

(52) U.S. Cl.
CPC ....... *B65G 37/00* (2013.01); *B65G 2201/0267* (2013.01)

(58) Field of Classification Search
CPC ......... B65G 35/06; B65G 47/56; B65G 1/127; B65G 47/684
USPC ........................ 198/347.1, 347.4, 465.1, 580
See application file for complete search history.

(56) References Cited

U.S. PATENT DOCUMENTS

| | | |
|---|---|---|
| 2,773,344 A | 12/1956 | van Hook |
| 2,944,380 A | 7/1960 | Klapper et al. |
| 3,067,781 A | 12/1962 | Dean et al. |
| 3,194,279 A | 7/1965 | Brown |
| 3,946,768 A | 3/1976 | Fiorentino |
| 4,368,614 A | 1/1983 | Groza et al. |
| 4,979,544 A | 12/1990 | Swindlehurst |
| 5,168,904 A | 12/1992 | Quinkert |
| 5,490,664 A | 2/1996 | Justus et al. |
| 5,522,436 A | 6/1996 | Tabuchi et al. |
| 5,526,562 A | 6/1996 | Kita et al. |
| 5,535,788 A | 7/1996 | Mori et al. |
| 6,308,944 B1 | 10/2001 | Ota et al. |
| 6,769,536 B2 | 8/2004 | Lutz |
| 7,500,435 B2 * | 3/2009 | Bartlett, Jr. ............ B61B 13/12 104/165 |
| 9,045,182 B2 * | 6/2015 | Cardani .................. B23P 19/06 |
| 2014/0130345 A1 | 5/2014 | Shinohara et al. |
| 2014/0131170 A1 | 5/2014 | Ookubo |

FOREIGN PATENT DOCUMENTS

GB 1081243 A * 8/1967 ........... B65G 19/265

* cited by examiner

*Primary Examiner* — Gene Crawford
*Assistant Examiner* — Lester Rushin
(74) *Attorney, Agent, or Firm* — Fishman Stewart PLLC

(57) ABSTRACT

An assembly line may include a first pallet elevator, a second pallet elevator, an upper track, and a lower track. The upper track may be connected between the first elevator and the second elevator, and may be configured to transport pallets between the first pallet elevator and the second pallet elevator. The lower track disposed below the upper track, and may be configured to transport pallets between the second pallet elevator and the first pallet elevator. A lower track drive system may be connected between the first pallet elevator and the second pallet elevator, and may be configured to engage a first set of a plurality of pallets. An upper track drive system may be configured to engage at least one of the plurality of pallets and to drive a second set of the plurality of pallets via the at least one pallet.

17 Claims, 16 Drawing Sheets

VERTICAL ASSEMBLY LINE

TECHNICAL FIELD

The present disclosure generally relates to assembly lines that may be used, for example, in connection with vehicle wiring harnesses.

BACKGROUND

Assembly lines may be used for assembling a wide range of products. Conventional assembly lines often convey pallets from one end to another and stop the pallets at one or more work stations along the line for operators to perform various assembly tasks. Assembly lines are often arranged in a circular or loop configuration such that once work on the product is complete, the pallets circle around to the beginning to be used again. However, such configurations are often not efficient with respect to the size of the floor plan required, the speed at which the pallets move, and/or the number of pallets required to complete the loop. An assembly line that addresses one or more of the above deficiencies may be desirable.

SUMMARY

An embodiment of the present disclosure includes an assembly line that may comprise a first pallet elevator, a second pallet elevator, and an upper track that may connect the first elevator and the second elevator. In embodiments, the upper track may be configured to transport pallets between the first pallet elevator and the second pallet elevator. In embodiments, the assembly line may include a lower track that may be disposed below the upper track and may be configured to transport pallets between the second pallet elevator and the first pallet elevator. In embodiments, the assembly line may include a lower track drive system that may be connected between the first pallet elevator and the second pallet elevator. In embodiments, the lower track drive system may be configured to engage a first set of a plurality of pallets. In embodiments, the assembly line may include an upper track drive system that may be configured to engage at least one of the plurality of pallets and to drive a second set of the plurality of pallets with the at least one pallet. In embodiments, the first pallet elevator may be configured to transport pallets between the lower track and the upper track, the second pallet elevator may be configured to transport pallets between the upper track to the lower track, and/or the lower track drive system may be independent of the upper track drive system.

In embodiments, an assembly line may comprise a first pallet elevator, a second pallet elevator, an upper track, and a lower track. In embodiments, a method of operating assembly line may include providing the assembly line and providing a plurality of pallets. In embodiments, a first set of the plurality of pallets may be disposed on the upper track and a second set of the plurality of pallets may be disposed on the lower track. The method may include driving, continuously via an upper track drive system, the first set of pallets at a constant speed. The method may include driving, intermittently via a lower track drive system, the second set of pallets according to positions of the first pallet elevator and the second pallet elevator.

Various aspects of the present disclosure will become apparent to those skilled in the art from the following detailed description of the various embodiments, when read in light of the accompanying drawings.

DETAILED DESCRIPTION

Figure 1:
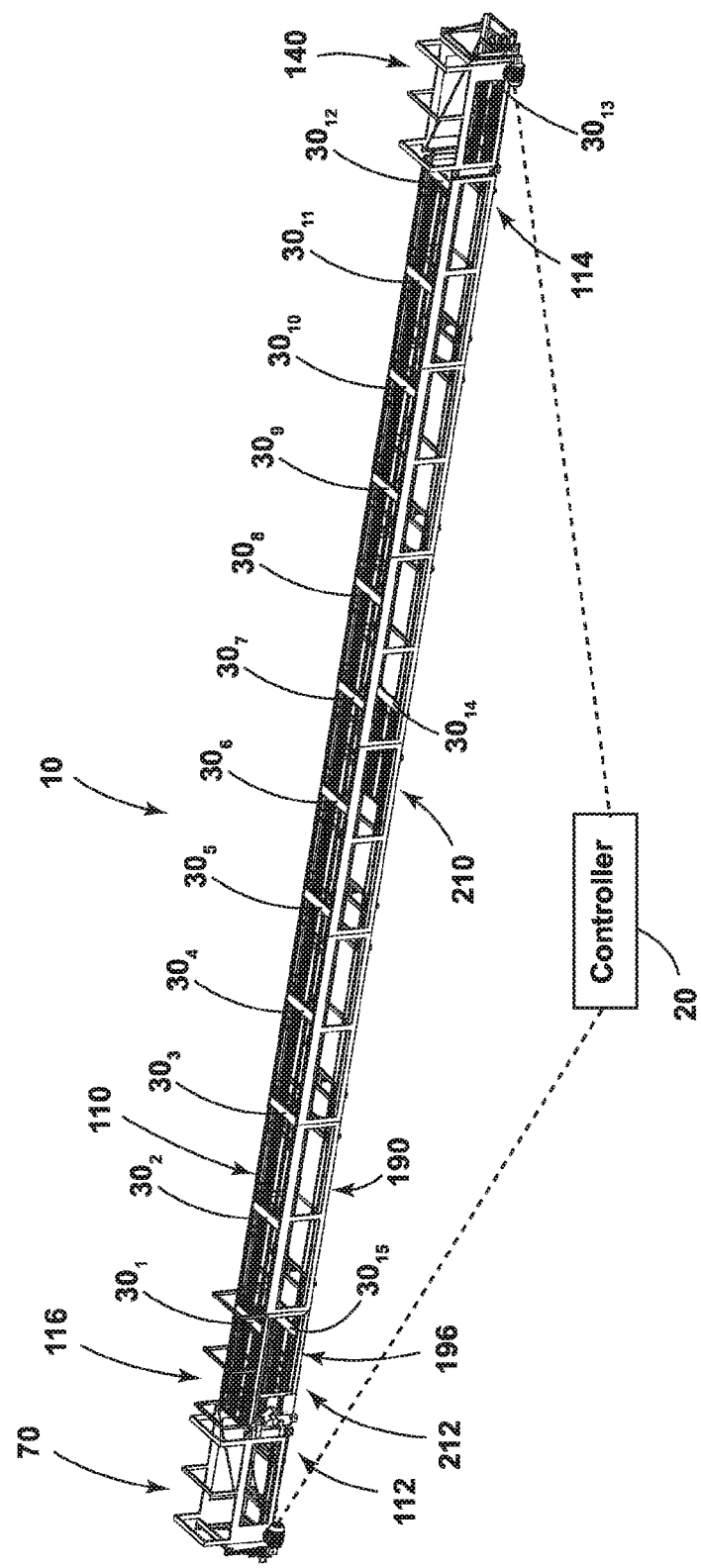
FIG. 1 is a perspective view generally illustrating portions of an assembly line, in accordance with embodiments of the present disclosure.

In embodiments, such as generally illustrated in FIG. 1, an assembly line 10 may be configured for transporting and/or moving one or more pallets $30_N$. In embodiments, assembly line 10 may include a controller 20, a first pallet elevator 70, an upper track 110, a second pallet elevator 140, and/or a lower track 190. In embodiments, controller 20 may be configured to control the operation of one or more of first pallet elevator 70, upper track 110, second pallet elevator 140, and/or lower track 190. In embodiments, unassembled products 12 may be disposed on and/or connected to pallets $30_N$ (e.g., at or near first pallet elevator 70), and controller 20 may be configured to cause assembly line 10 to transport/ cycle the pallets $30_N$ between first pallet elevator 70 and second pallet elevator 140. Operators and/or machines may assemble products 12 on the pallets $30_N$ between first pallet elevator 70 and second pallet elevator 140 (e.g., as pallets $30_N$ move along upper track 110 and/or lower track 190). In embodiments, operators and/or machines may assemble products on the pallets $30_N$ while the pallets $30_N$ are disposed on/in first pallet elevator 70 and/or second pallet elevator 140. Completed/assembled products 12 may, for example, be removed from the pallets $30_N$ before, at, or about second pallet elevator 140, and second pallet elevator 140 may transport pallets $30_N$ from upper track 110 (e.g., once completed/assembled products 12 have been removed) down to lower track 190. Assembly line 10 may be configured to transport pallets $30_N$ from second pallet elevator 140 back to first pallet elevator 70, and first pallet elevator 70 may transport pallets $30_N$ from lower track 190 back up to upper track 110.

In embodiments, controller 20 may include an electronic controller and/or include an electronic processor, such as a programmable microprocessor and/or microcontroller. In embodiments, controller 20 may include, for example, an application specific integrated circuit (ASIC). Controller 20 may include a central processing unit (CPU), memory, and/or an input/output (I/O) interface. Controller 20 may be configured to perform various functions, including those described in greater detail herein, with appropriate programming instructions and/or code embodied in software, hardware, and/or other medium. In embodiments, controller 20 may include a plurality of controllers.

Figure 2A:
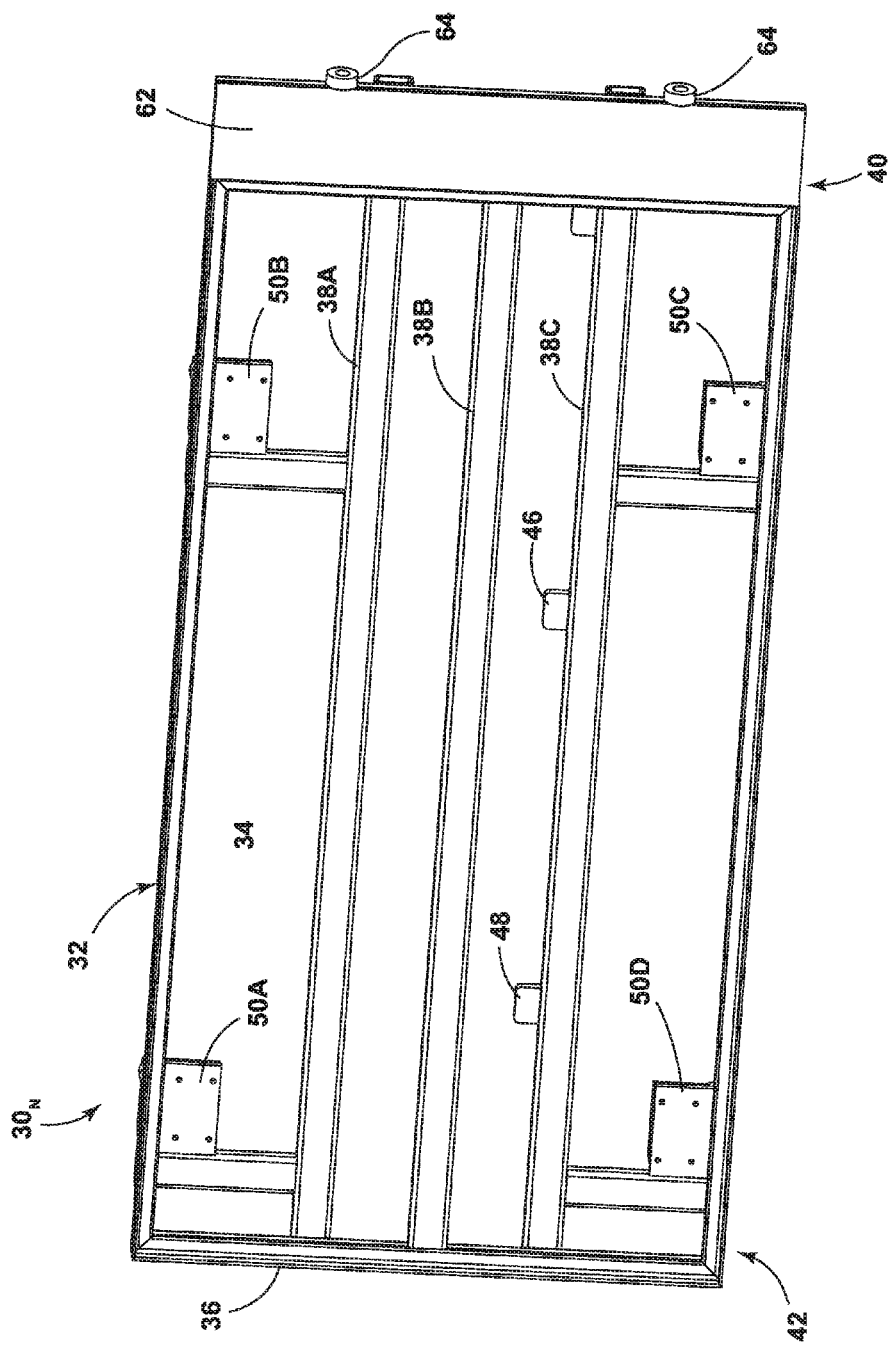
FIGS. 2A, 2B, and 2C are perspective views generally illustrating portions of pallets, in accordance with embodiments of the present disclosure.
Figure 2B:
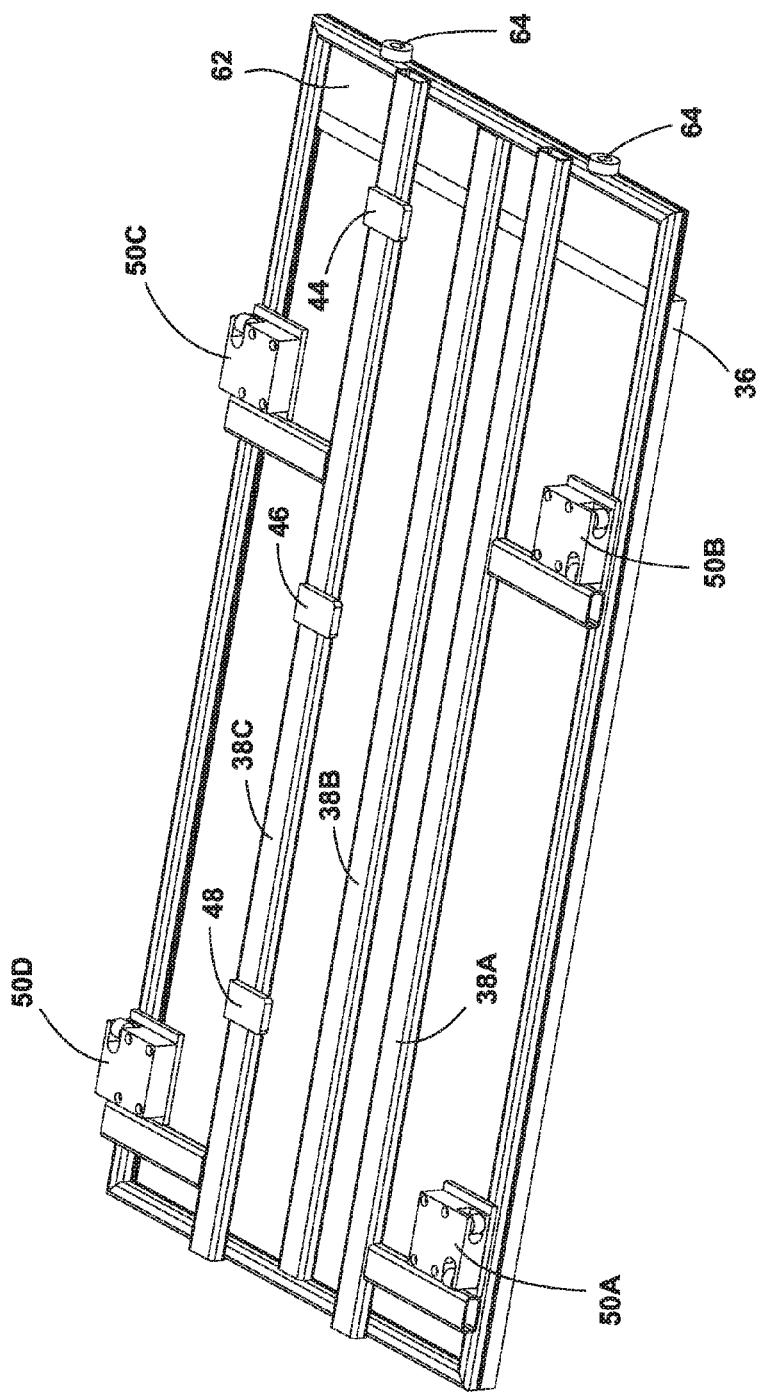

In embodiments, such as generally illustrated in FIGS. 2A and 2B, pallets $30_N$ may include one or more of a variety of shapes, sizes, and/or configurations. For example, and without limitation, pallets $30_N$ may include a frame 32 that may include a generally rectangular shape and one or more support members (e.g., support members 38A, 38B, 38C) that may extend from a first end 40 of pallet $30_N$ to a second end 42 of the pallet $30_N$. In embodiments, one or more pallets $30_N$ may be, for example, about 5.5 feet long.

In embodiments, pallet frame 32 may include horizontal and vertical portions 34, 36, which may be configured to support and/or retain one or more product boards 14. For example, and without limitation, horizontal portion 34 may be configured to support the bottoms of one or more product boards 14 and vertical portion 36 may be configured to restrict horizontal movement of product boards 14. In embodiments, product boards may be configured to hold one or more products 12, such as a wiring harness. In embodiments, a single product board 14 may be disposed on a pallet $30_N$ (e.g., within pallet frame 32). In other embodiments, a plurality of product boards 14 may be disposed on a single pallet $30_N$ (e.g., in a side-by-side configuration).

In embodiments, pallets $30_N$ may include one or more flanges (e.g., flanges 44, 46, 48) that may be configured to be driven by and/or engaged by dogs (e.g., pushing dogs), such as of first pallet elevator 70, an upper track drive system 116, second pallet elevator 140, and/or a lower track drive system 196. In embodiments, flanges 44, 46, 48 may include one or more of a variety of shapes, sizes, and/or configurations, and may include, for example a generally rectangular shape. Flanges 44, 46, 48 may be disposed on and/or at the underside of pallets and/or may be fixed to a support member (e.g., support member 38C).

Figure 2C:
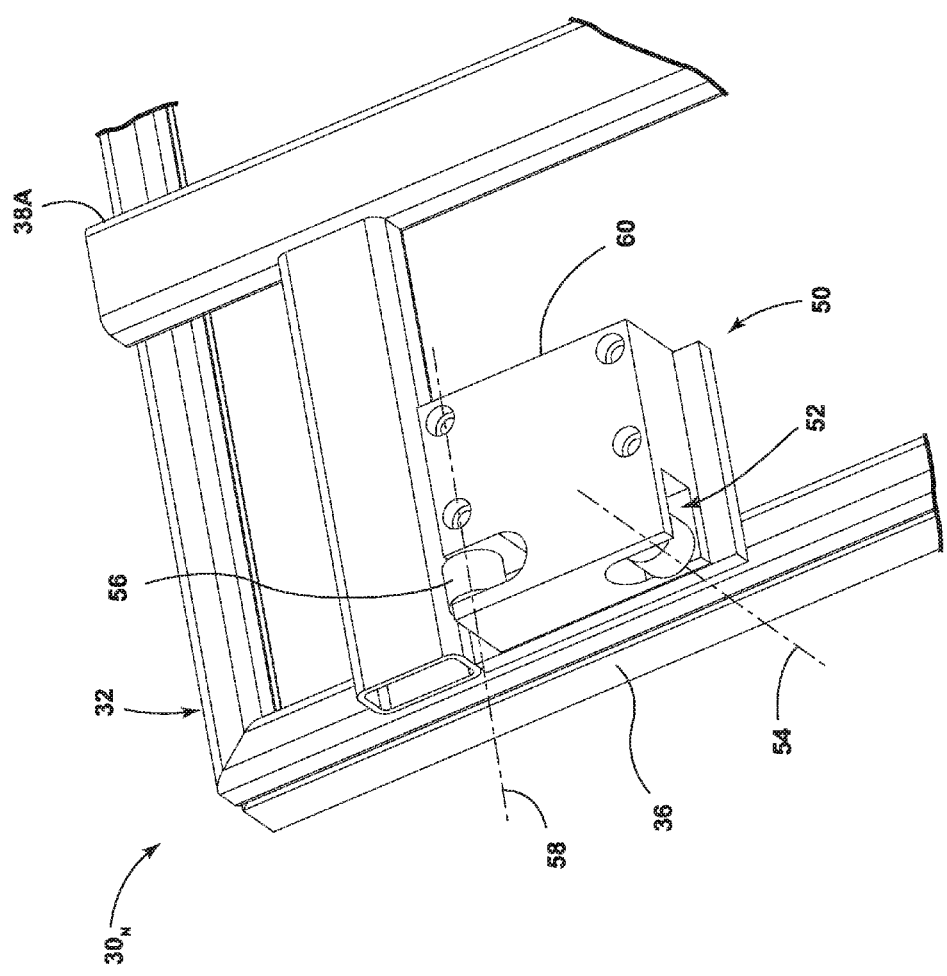
Figure 2D:
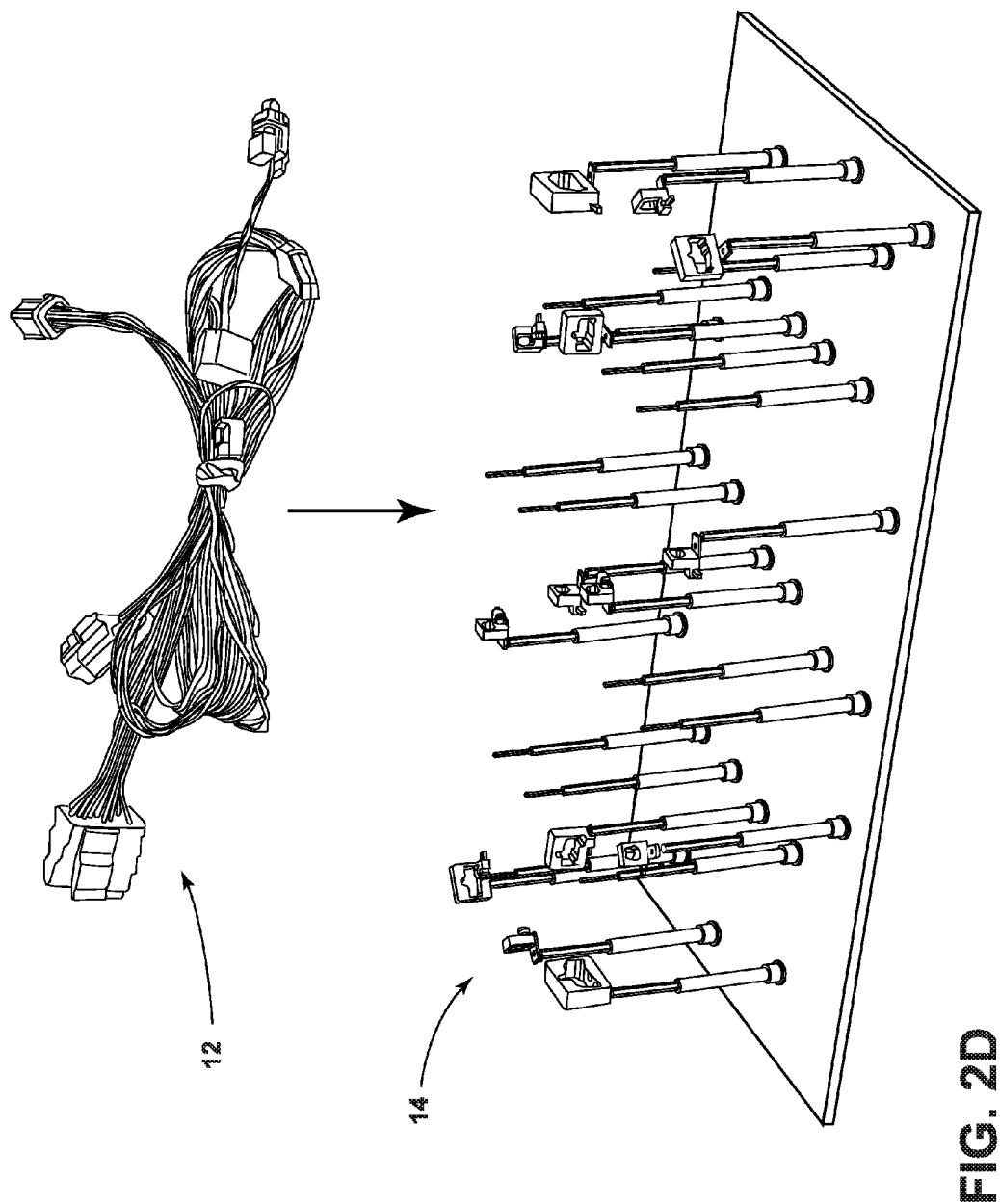
FIG. 2D is a perspective view generally illustrating portions of a product and a product board, in accordance with embodiments of the present disclosure.

In embodiments, such as generally illustrated in FIGS. 2A, 2B, and 2C, pallets $30_N$ may include one or more sliding devices 50 that may configured to facilitate movement of pallets along/in first pallet elevator 70, upper track 110, second pallet elevator 140, and/or lower track 190. In embodiments, sliding devices 50 may include a first roller 52 and a second roller 56. In embodiments, first roller 52 may be configured to contact vertical track portions (e.g., of tracks, and/or pallet elevators) and may be configured to rotate about a vertical axis 54. In embodiments, second roller 56 may be configured to contact horizontal track portions (e.g., of tracks, and/or pallet elevators) and may be configured to rotate about a horizontal axis 58. In embodiments, first roller 52 and second roller 56 may be disposed in a common housing 60 that may include a generally rectangular shape. In embodiments, one or more pallets $30_N$ may each include, for example, four sliding devices (e.g., sliding devices 50A, 50B, 50C, 50D). A first set of two rolling devices (e.g., sliding devices 50A, 50B) may be disposed at a first side of frame and/or a second set of sliding devices (e.g., sliding devices 50C, 50D) may be disposed at a second side of frame 32 (e.g., sliding devices 50 may be disposed in a generally rectangular configuration).

In embodiments, one or more pallets $30_N$ may include a buffer region 62 that may be disposed at first end 40 or second end 42 of pallets $30_N$, or may be split between first end 40 and second end 42. Buffer region 62 may provide additional time for operators/machines to work on a particular pallet $30_N$ (e.g., increased operation time). For example, and without limitation, buffer region 62 may comprise about 10% of the overall length of a pallet $30_N$ (e.g., may be about 6 inches long), but may be more or less than 10%, and the size of buffer region 62 may correspond to a desired amount of additional time for operators/machines. In embodiments, one or more bumpers 64 may be disposed at first end 40 and/second end 42 of pallets $30_N$, which may include being fixed to buffer region 62. Bumpers 64 may be configured to contact a preceding pallet $30_N$ (e.g., a pallet $30_N$ that is closer to first pallet elevator 70) and/or may be configured to receive a force (e.g., a pushing force) from the preceding pallet $30_N$. In embodiments, bumpers 64 may be configured to absorb and/or dampen forces between adjacent pallets $30_N$ and/or between pallets $30_N$ and other assembly line components, which may reduce and/or prevent damage. In embodiments, horizontal portion 34 and/or vertical portion 36 of pallet frame 32 may not extend into buffer region 62.

Figure 3A:
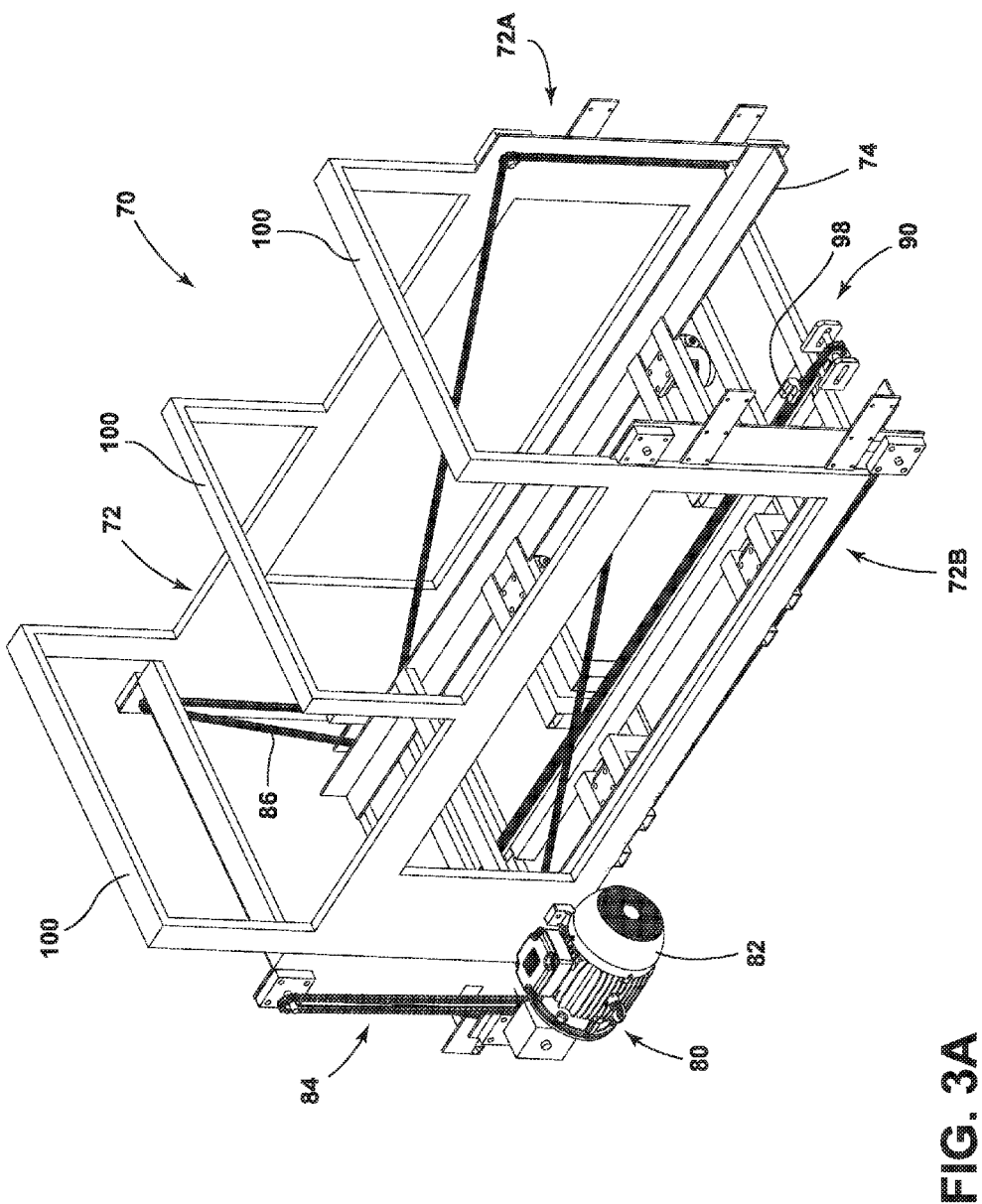
FIGS. 3A and 3B are perspective views generally illustrating portions of pallet elevators, in accordance with embodiments of the present disclosure.
Figure 3B:
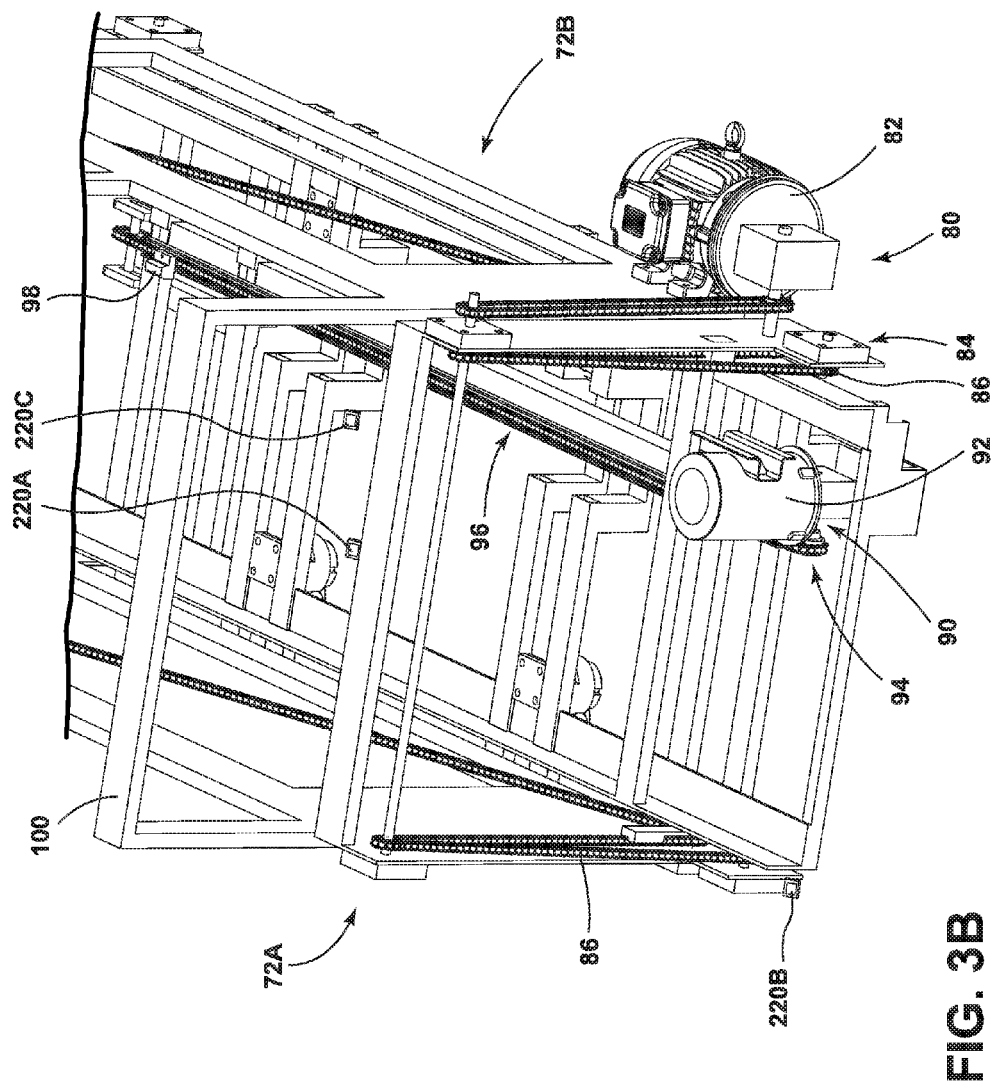
Figure 4A:
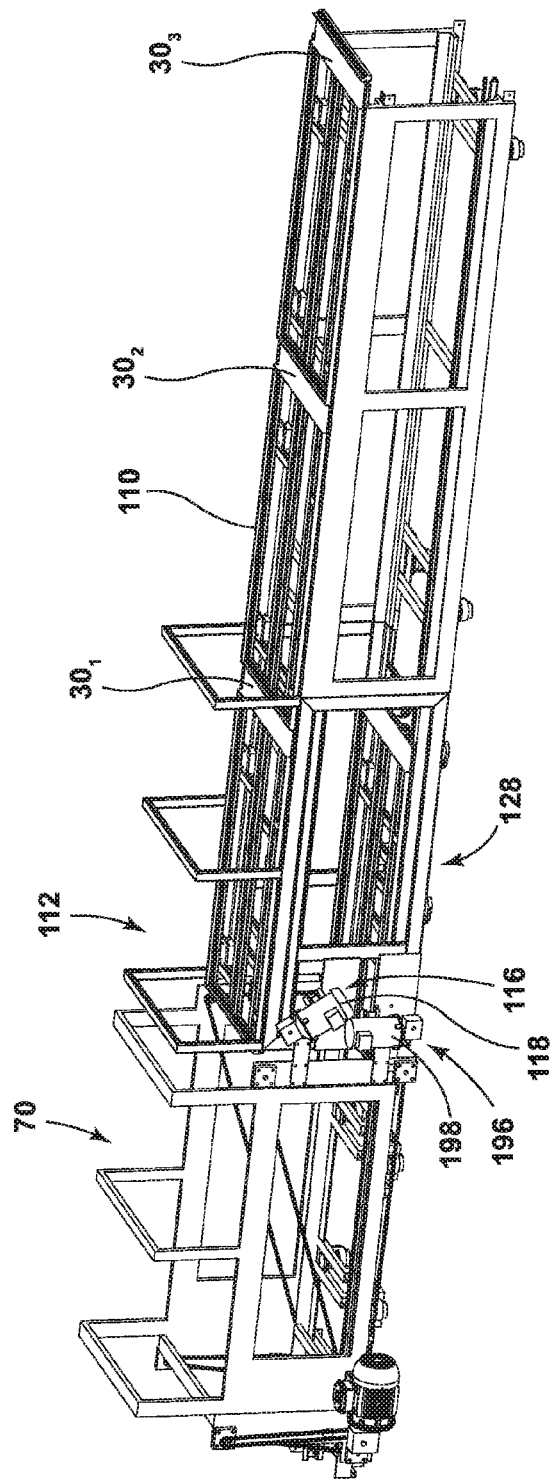
FIGS. 4A, 4B, 4C and 4D are perspective views generally illustrating portions of a pallet elevator and upper track drive systems, in accordance with embodiments of the present disclosure.
Figure 4B:
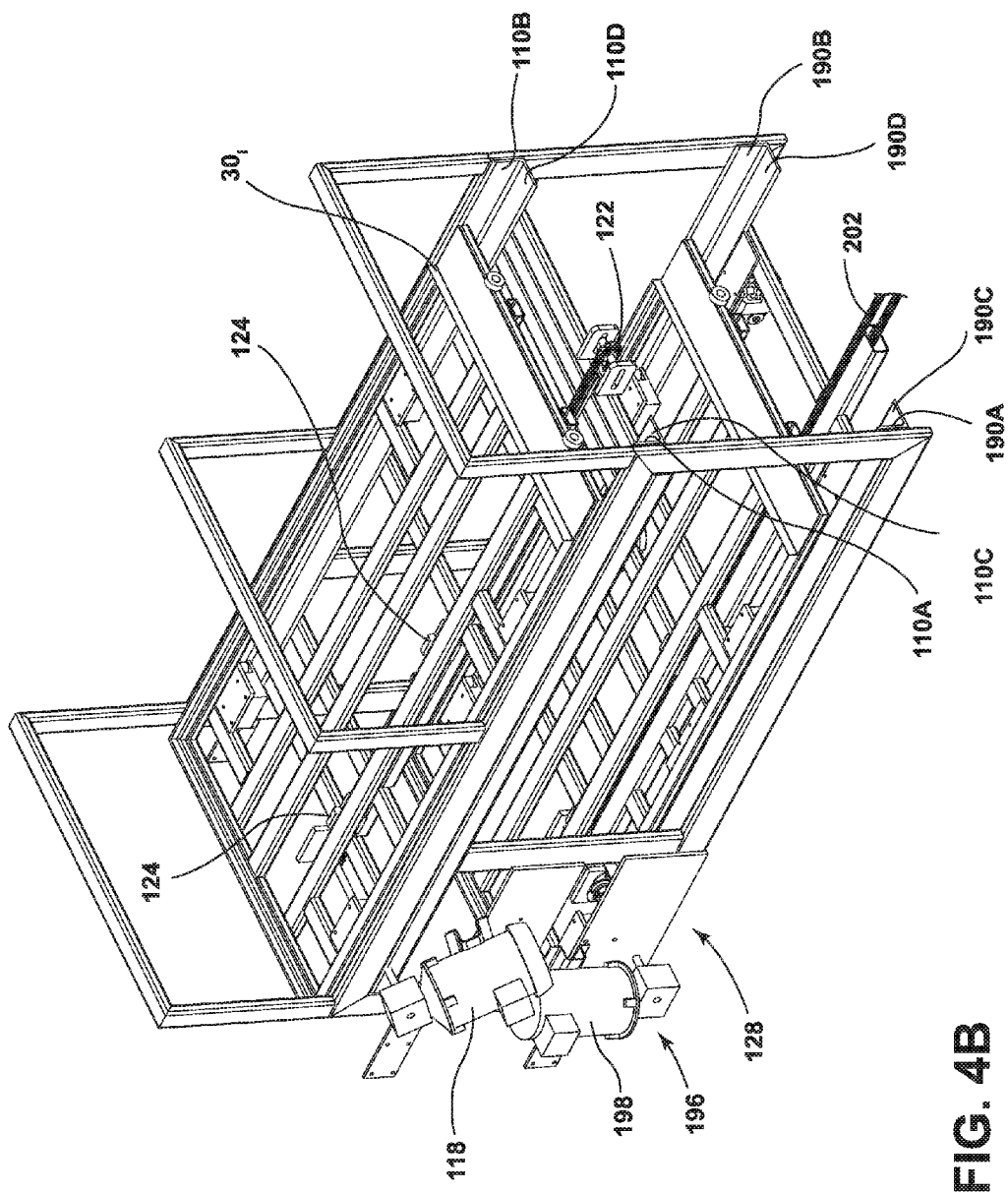

In embodiments, such as generally illustrated in FIGS. 3A, 3B, and 4A, assembly line 10 may include first pallet elevator 70. First pallet elevator 70 may be configured transport pallets $30_N$ between upper track 110 and lower track 190. For example, and without limitation, first elevator 70 may be configured to receive pallets $30_N$ from lower track 190, transport pallets $30_N$ upward so that the pallets $30_N$ are aligned with upper track 110. In embodiments, first pallet elevator 70 may be configured to apply a force to pallets $30_N$ that may drive and/or push pallets out of first pallet elevator 70 (e.g., onto upper track 110). In embodiments, first pallet elevator 70 may include a support frame 72, a pallet cart 74, a vertical drive system 80, and/or a horizontal drive system 90. In embodiments, support frame 72 may be configured to support one or more of pallet cart 74, vertical drive system 80, and/or horizontal drive system 90.

In embodiments, vertical drive system 80 may be configured to transport pallet cart 74, which may be configured to receive a pallet $30_N$, between lower track 190 and upper track 110. Vertical drive system 80 may include, for example, a motor 82 (e.g., an AC motor) that may be connected to a gear and chain arrangement 84. Gear and chain arrangement 84 may include a first elevator vertical chain 86 and pallet cart 74 may be connected and/or fixed to first elevator vertical chain 86. In embodiments, first elevator vertical chain 86 may include a plurality of chains. In embodiments, controller 20 may be configured to cause motor 82 to drive the gear and chain arrangement 84, which may raise and/or lower pallet cart 74 depending on the direction of rotation of motor 82. In embodiments, vertical drive system 80 may include one or more other actuators (e.g., in addition to or instead of motor 82), such as, for example, a hydraulic cylinder, a hydraulic motor, a pneumatic cylinder, a pneumatic motor, and/or other actuator.

In embodiments, horizontal drive system 90 may be configured to engage flanges (e.g., front flange 44 and/or middle flange 46) of pallets $30_N$ to pull pallets $30_N$ into first pallet elevator 70 (e.g., from lower track 190) and/or to push pallets $30_N$ out of first pallet elevator 70 (e.g., onto upper track 110). For example, and without limitation, horizontal drive system 90 may include a motor 92 (e.g., an AC motor) that may be connected to a gear and chain arrangement 94 that may include a first elevator horizontal chain 96. One or more dogs 98 (e.g., drive dogs) may be connected and/or fixed to first elevator horizontal chain 96 and may be configured to engage pallet flanges (e.g., front flange 44 and/or middle flange 46). In embodiments, horizontal drive system 90 may be connected and/or fixed to pallet cart 74 such that horizontal drive system 90 moves (e.g., vertically) with pallet cart 74.

In embodiments, support frame 72 may include one or more cross members 100 that may extend from a first side 72A of support frame 72 to a second side 72B of support frame 72 and may provide structural support to support frame 72.

In embodiments, such as generally illustrated in FIG. 4A, a first end 112 of upper track 110 may be disposed in proximity to and/or connected to first pallet elevator 70. Upper track 110 may include vertical portion 110A, 110B and/or horizontal portions 110C, 110D that may be configured for pallets $30_N$ to slide and/or roll along (e.g., upper track 110 may include a generally U-shaped configuration that may be formed via opposing L-shaped sections). Upper track 110 may include an upper track drive system 116 that may be configured to drive pallets $30_N$ along upper track 110 (see, e.g., FIGS. 4A, 4B, 4C, and 4D). Upper track drive system 116 may include, for example, a motor 118 (e.g., an AC motor) that may be connected to a gear and chain arrangement 120 that may include an upper track chain 122. One or more dogs 124 (e.g., pushing dogs) may be fixed to upper track chain 122 and may be configured to engage flanges (e.g., flange 44, 46, and/or 48) of pallets $30_N$. For example, and without limitation, a first pair of dogs 124A, 124B may be fixed to upper track chain 122 at a first location 126 and/or a second pair of dogs 124C, 124D may be fixed to upper track chain 122 at a second location 128. First location 126 may be disposed at a distance D1 from second location 128, such as, for example, about 44 inches (e.g., the distance between dog 124B and dog 124C and/or the distance between dog 124D and dog 124A, along upper track chain 122). Dogs 124A, 124B of the first pair of dogs may be separated from each other by a distance D2 that may correspond to the distance between pallet flanges (e.g., flanges 44, 46) and may be, for example, about 22 inches. In embodiments, dogs 124C, 124D of the second pair of dogs may be separated from each other by a distance D3 that may correspond to the distance between pallet flanges, such as for example, about 22 inches.

In embodiments, horizontal drive system 90 of first pallet elevator 70 may begin to push a pallet $30_N$ out first pallet elevator 70 and first pair of dogs 124A, 124B (or second pair 124C, 124D) of upper track drive system 116 may engage the front flange 44 and the middle flange 46 of the pallet $30_N$ to pull the pallet $30_N$ onto upper track 110. Dogs 124A, 124B may continue to engage front flange 44 and middle flange 46 to drive the pallet $30_N$ forward. In embodiments, upper track drive system 116 may be configured to drive some or all of the pallets $30_N$ on upper track 110 via the first pallet (e.g., pallet $30_1$). For example, and without limitation, upper track drive system 116 may only extend along upper track 110 for about the length of one pallet $30_N$ (e.g., about 5.5 feet), upper track 110 may be configured to simultaneously support a plurality of pallets $30_N$ (e.g., pallets, $30_1$, $30_2$, $30_3$, $30_4$, $30_5$, $30_6$, $30_7$, $30_8$, $30_9$, $30_{10}$, $30_{11}$, $30_{12}$), and upper track drive system 116 may be configured to drive all of the plurality of pallets $30_N$ even though upper track drive system 116 may, for example, engage only one pallet at a time (e.g., first pallet $30_1$ on upper track 110).

Figure 5A:
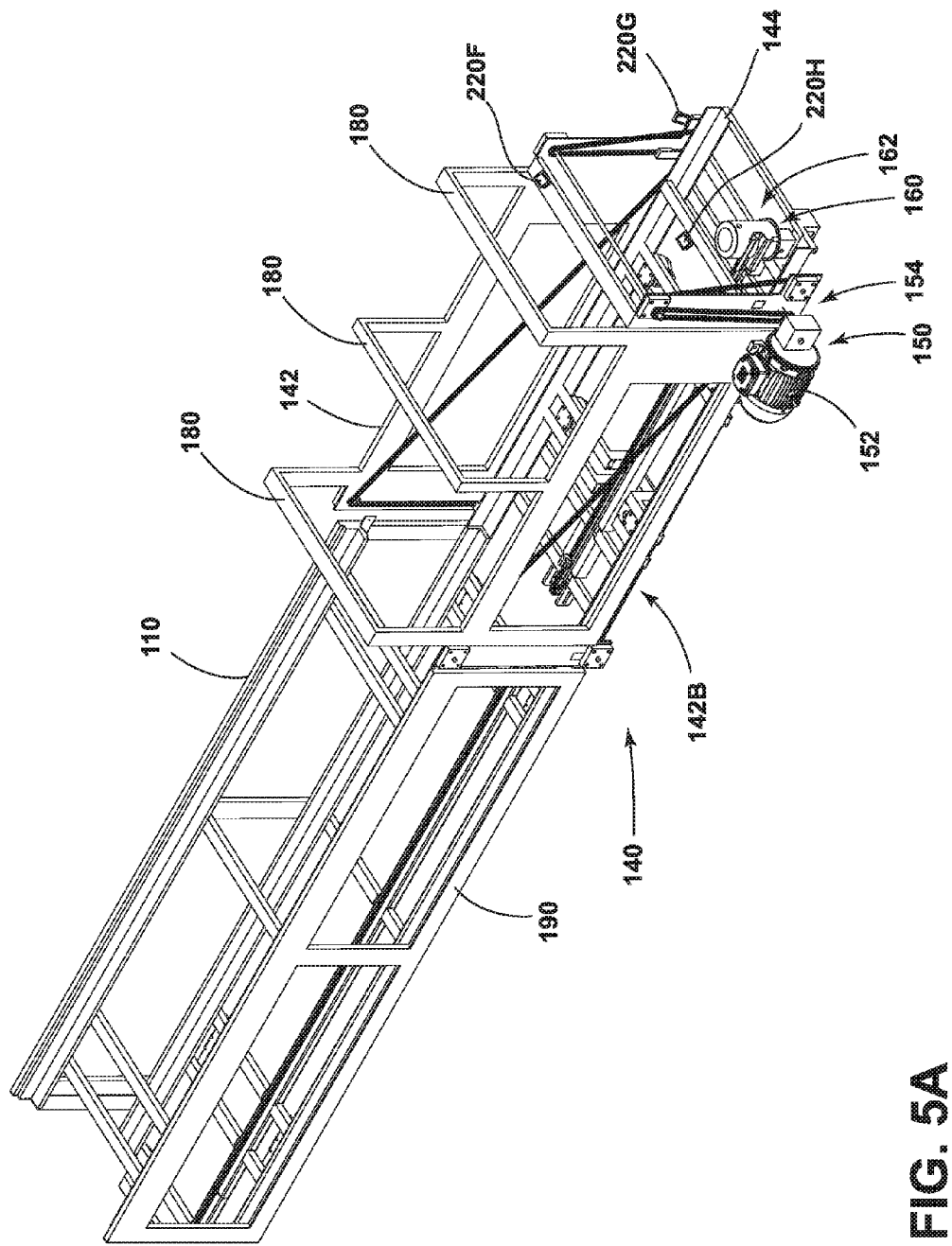
FIGS. 5A, 5B, and 5C are perspective views generally illustrating portions of pallet elevators, in accordance with embodiments of the present disclosure.

In embodiments, such as generally illustrated in FIG. 5A, second pallet elevator 140 may be disposed proximate to and/or may be connected to a second end 114 of upper track 110. Second pallet elevator 140 may be configured to transport pallets $30_N$ between upper track 110 and lower track 190 (see, e.g., FIGS. 5A, 5B, and 5C). For example, and without limitation, second pallet elevator 140 may be configured to receive and/or pull pallets $30_N$ from upper track 110, transport pallets $30_N$ down to lower track 190, and/or push pallets $30_N$ out onto lower track 190.

In embodiments, second pallet elevator 140 may be configured in the same or a similar manner as first pallet elevator 70. For example, and without limitation, second pallet elevator 140 may include a support frame 142, a pallet cart 144, a vertical drive system 150, and/or a horizontal drive system 160. In embodiments, support frame 142 may be configured to support one or more of pallet cart 144, vertical drive system 150, and/or horizontal drive system 160.

In embodiments, vertical drive system 150 may be configured to transport pallet cart 144, which may be configured to receive a pallet $30_N$, between lower track 190 and upper track 110. Vertical drive system 150 may include, for example, a motor 152 (e.g., an AC motor) that may be connected to a gear and chain arrangement 154. Gear and chain arrangement 154 may include a second elevator vertical chain 156. In embodiments, pallet cart 144 may be connected to and/or fixed to move with second elevator vertical chain 156. In embodiments, second elevator chain 156 may include a plurality of chains. In embodiments, controller 20 may be configured to cause motor 152 to drive gear and chain arrangement 154, which may raise or lower pallet cart 144, depending on the direction of rotation of motor 152. In embodiments, vertical drive system 150 may include one or more other actuators (e.g., in addition to or instead of motor 152), such as, for example, a hydraulic cylinder, a hydraulic motor, a pneumatic cylinder, a pneumatic motor, and/or other actuator.

In embodiments, horizontal drive system 160 may be configured to engage flanges (e.g., flange 44, 46, and/or 48) of pallets $30_N$ to pull pallets $30_N$ into first pallet elevator (e.g., from upper track 110) and/to push pallets $30_N$ out of second pallet elevator 140 (e.g., onto lower track 190). For example, and without limitation, horizontal drive system 160 may include a motor 162 (e.g., an AC motor) that may be connected to gear and chain arrangement 164 that may include a second elevator horizontal chain 166. One or more dogs 168 (e.g., pushing dogs) may be fixed to second elevator horizontal chain 166 and may be configured to engage one or more pallet flanges (e.g., front flanges 44). In embodiments, horizontal drive system 160 may be fixed to pallet cart 144 such that horizontal drive system 160 may move (e.g., vertically) with pallet cart 144 upon activation/operation of vertical drive system 150.

In embodiments, second pallet elevator support frame 142 may include one or more cross members 180 that may extend from a first side 142A of support frame 142 to a second side 142B of support frame 142 and may provide structural support to support frame 142.

In embodiments, such as generally illustrated in FIGS. 4A, 4B, 4C, 6, and 7, lower track 190 may be configured to transport pallets $30_N$ (e.g., empty pallets) from second pallet elevator 140 to first pallet elevator 70, and may include a lower track drive system 196. In embodiments, lower track 190 may include vertical portions 190A, 190B and/or horizontal portions 190C, 190D that may be configured for pallets $30_N$ to slide and/or roll along (e.g., lower track 190 may include a generally U-shaped configuration that may be formed via opposing L-shaped sections). Lower track drive system 196 may include, for example, a motor 198 (e.g., an AC motor) that may be connected to a gear and chain arrangement 200 that may include a lower track chain 202. Lower track chain 202 may include a loop configuration and may extend from a first end 192A of lower track 190 (e.g., at or about second pallet elevator 140) to a middle section 194 of lower track, and/or to a second end 192B of lower track 190 (e.g., at or about first pallet elevator 70). In embodiments, a plurality of dogs 204 may be connected and/or fixed to lower track chain 202. The plurality of dogs 204 may include a first type of dog 204A and second type of dog 204B. In embodiments, the first type of dog may be configured in the same or similar manner as dogs 98 of first pallet elevator 70, dogs 124 of upper track drive system 116, and/or dogs 168 of second pallet elevator 140. The first type of dog 204A may be referred to herein as fixed dogs 204A. In embodiments, fixed dogs 204A may be configured to drive pallet flanges (e.g., front flange 44 and/or rear flange 48) from the rear (e.g., relative to the direction of travel, which may be toward first pallet elevator 70).

Figure 7:
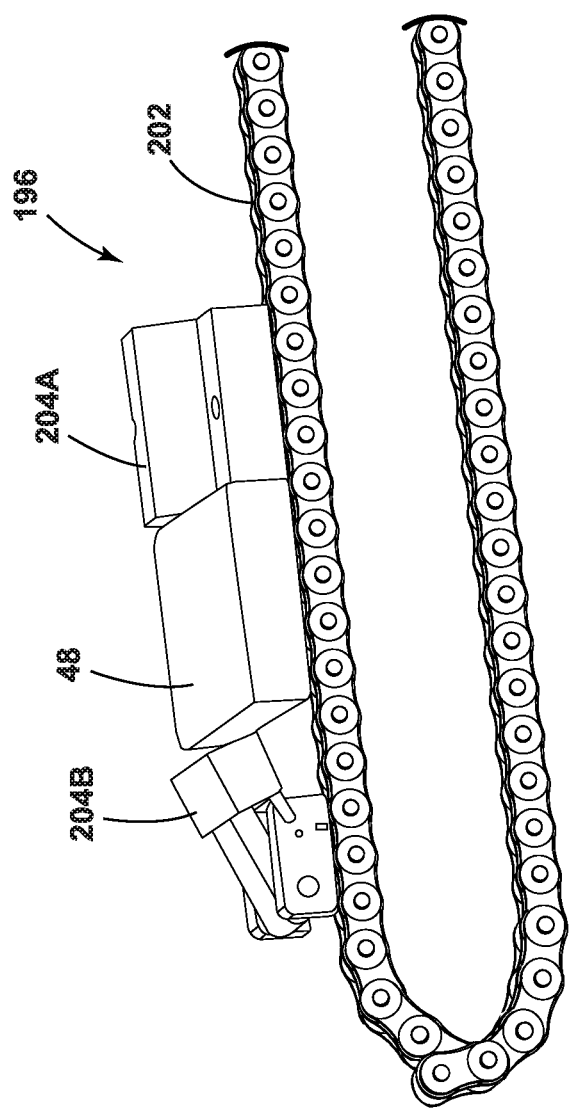
FIG. 7 is a perspective view generally illustrating portions of a pair of dogs and a chain of a lower track drive system and a pallet flange, in accordance with embodiments of the present disclosure.

The second type of dog 204B may be configured to deflect/slide under pallet flanges (e.g., flanges, 44, 46, 48) in at least one direction (e.g., the direction of pallet movement) and may be configured restrict pallet movement once the dog 204B has moved under a flange. The second type of dog 204B may be referred to herein as deflecting dogs 204B. For example, and without limitation, deflecting dogs 204B may be biased and/or spring loaded such that if a deflecting dog 204B comes into contact with a flange from a first direction, the deflecting dog 204B may deflect downward to slide under and/or not materially engage the flange. Once a deflecting dog 204B slides under a flange, it may deflect back up to a resting position (e.g., as shown in FIG. 7). In the resting position, a deflecting dog 204B may restrict movement of a pallet $30_N$ (e.g., via a flange). For example, and without limitation, if a deflecting dog 204B comes into contact with a flange from a second direction (e.g., while the deflecting dog 204B is in the resting position), the deflecting dog 204B may not deflect and may restrict movement of the flange and/or the pallet $30_N$.

In embodiments, such as generally illustrated in FIG. 7, one or more fixed dogs 204A may be paired with one or more deflecting dogs 204B. Such pairs of dogs 204A, 204B may be configured to be disposed on opposite sides of a flange such that a deflecting dog 204B may be disposed at or about the front of a rear flange 48 (e.g., ahead in the direction of movement) and a fixed dog 204A may be disposed at or about the rear of the flange 48 (e.g., a pair of dogs 204A, 204B may "trap" a flange). In such a configuration, the deflecting dog 204B may be configured restrict/prevent movement of a pallet $30_N$ from when lower track chain 202 stops moving (e.g., further movement toward first pallet elevator 70).

In embodiments, pallets $30_N$ moving along lower track 190 may effectively be disposed in a reverse configuration such that rear flange 48 is disposed at a "front" of the pallet relative to the direction of travel (e.g., toward first pallet elevator 70) and that front flange 44 is disposed at the "rear" of the pallet $30_N$. In embodiments, a pair of dogs (e.g., a fixed dog 204A and a deflecting dog 204B) may engage a rear flange 48 of a pallet $30_N$ and a fixed dog 204A may engage a front flange 44 of the pallet $30_N$. In embodiments, lower track drive system 196 may not engage middle flanges 46 of pallets $30_N$.

In embodiments, lower track drive system 196 may remain engaged with and/or continue to drive pallets $30_N$ on lower track 190 along the entire length or substantially the entire length of lower track 190 (e.g., from first end 192A to second end 192B). For example, and without limitation, lower track drive system 196 may remain engaged with pallets $30_N$ from second pallet elevator 140 along all of lower track 190 and may begin pushing pallets $30_N$ into first pallet elevator 70, at which point, first pallet elevator horizontal drive system 90 may pull pallets $30_N$ into first pallet elevator 70. Once a pallet $30_N$ has been pulled into first pallet elevator 70 from lower track 190, controller 20 may cause first pallet elevator vertical drive system 80 to raise pallet cart 74 up to upper track 110 and may then cause first pallet elevator horizontal drive system 90 to push the pallet $30_N$ out onto upper track 110.

In embodiments, controller 20 may be configured to independently operate first pallet elevator 70, upper track 110, second pallet elevator 140, and/or lower track 190. In embodiments, controller 20 may be configured to cause upper track drive system 116 to drive the first pallet $30_1$ on upper track 110, which may push some or all of the other pallets (e.g., pallets $30_2$-$30_{12}$, such that some or all of the pallets $30_N$ on upper track 110 are continuously moving. In embodiments, upper track drive system 116 may cause continuous movement of pallets $30_N$ on upper track 110 and the continuous movement may be at a constant speed. In embodiments, controller 20 may control first pallet elevator 70 to cause horizontal drive system 90 to push pallets $30_N$ out of first pallet elevator 70 at a rate sufficient to maintain continuous movement of pallets $30_N$ on upper track (e.g., such that upper track drive system 116 is always engaged with at least one pallet $30_N$ and is driving at least one pallet $30_N$ to push some or all of the other pallets $30_N$ on upper track 110). Controller 20 may be configured to control second pallet elevator 140 to cause horizontal drive system 160 to pull/receive pallets $30_N$ from upper track 110 at a rate fast enough to allow continuous movement of pallets $30_N$ on upper track 110 (e.g., horizontal drive system 160 may move pallets $30_N$ faster than the constant speed of upper track drive system 116). Controller 20 may cause second pallet elevator 140 to lower a pallet $30_N$ to the lower track 190 (via pallet cart 144), push the pallet $30_N$ out onto lower track 190, and return pallet cart 144 to upper track 110 to receive another pallet $30_N$ at a fast enough rate that continuous movement of pallets $30_N$ on upper track 110 is not impeded. For example, and without limitation, controller 20 may be configured to cause pallet cart 144 to move from its lowered position (e.g., aligned with lower track 190) to its raised position (e.g., aligned with upper track 110) in about 5.5 seconds.

In embodiments, once second pallet elevator 140 receives a pallet $30_N$ from upper track 110, vertical drive system 150 may lower pallet cart 144 down to a lowered position (e.g., aligned with lower track 190). Once pallet cart 144 arrives at the lowered position, controller 20 may cause horizontal drive system 160 to push the pallet $30_N$ out of pallet cart 144 onto lower track 190 and controller 20 may cause lower track drive system 196 to engage the pallet $30_N$. As lower track drive system 196 operates to engage the pallet $30_N$ from second pallet elevator 140, lower track drive system 196 may also drive the pallets $30_N$ that are already disposed on lower track 190. For example, and without limitation, lower track 190 may include a plurality of pallet resting positions, such as a first resting position 210 that may be disposed at or about middle section 194 of lower track 190 (e.g., about half way between first pallet elevator 70 and second pallet elevator 140) and/or a second resting position 212 may be disposed at or about a second end 192B of lower track 190 (e.g., near first pallet elevator 70). Controller 20 may be configured to operate lower track drive system 196 such that pallets 30$_N$ are either disposed at a resting position 210, 212 (e.g., stationary) or are moving toward first pallet elevator 70 (e.g., toward a resting position, and/or into first pallet elevator 70). In embodiments, controller 20 may operate lower track drive system 196 at a faster speed than upper track drive system 116 (e.g., the speed of lower track chain 202 may be greater than the speed of upper track chain 122).

In embodiments, controller 20 may be configured to control assembly line 10 such that at least portions of at least two pallets 30$_N$ are disposed on lower track 190 at all times. For example, and without limitation, in a resting state of lower track 190 and/or lower track drive system 196, a first pallet (e.g., pallet 30$_{13}$) may be disposed at first resting position 210, a second pallet (e.g., pallet 30$_{14}$) may be disposed at second resting position 212, and no other pallets 30$_N$ may be disposed on lower track 190. In an active state, a pallet (e.g., pallet 30$_{15}$) may be moving onto lower track 190 from second pallet elevator 140, another pallet (e.g., pallet 30$_{13}$) may be moving from first resting position to second resting position, and/or yet another pallet (e.g., pallet 30$_{14}$) may be moving from second resting position 212 into first pallet elevator 70 (e.g., at least portions of pallets 30$_{13}$, 30$_{14}$, 30$_{15}$ may be simultaneously disposed on lower track 190, but there may not be any portions of other pallets 30$_N$ disposed on lower track). In embodiments, a maximum number of pallets 30$_N$ that may be at least partially disposed on lower track 190 may be one more than the number of resting positions. For example, and without limitation, if lower track 190 includes three resting positions, the maximum number of pallets 30$_N$ that may simultaneously be at least partially disposed on lower track 190 may be four. In contrast, conventional assembly lines may require return sections of assembly lines to be completely full of pallets. As pallets may be expensive, reducing the number of pallets used by assembly line 10 may permit assembly line 10 to be less expensive to set up, operate, and/or maintain.

In embodiments, assembly line may include one or more sensors 220. Sensors 220 may be configured to sense and/or monitor one or more of a variety of characteristics and/or parameters of assembly line 10. For example, sensors 220 may include one or more proximity sensors. In embodiments, sensors 220 may include one or more of a variety of configurations. For example, and without limitation, sensors may include mechanical sensors, electrical sensors, magnetic sensors, optical sensors, and/or other sensors. In embodiments, controller 20 may be configured to communicate with one or more of sensors 220.

In embodiments, first pallet elevator 70 may include, for example, sensors 220A, 220B, 220C (see, e.g., FIG. 3B). Sensor 220A may be configured to sense whether pallet cart is in proximity to sensor 220A (e.g., whether pallet cart 74 is in a raised position). Sensor 220B may be configured to sense whether pallet cart 74 is in proximity to sensor 220B (e.g., whether pallet cart 74 is in a lowered position). Sensor 220C may be configured to sense whether a pallet 30$_N$ is present in pallet cart 74 (e.g., whether a pallet 30$_N$ is connected to and/or completely on pallet cart 74).

Figure 4C:
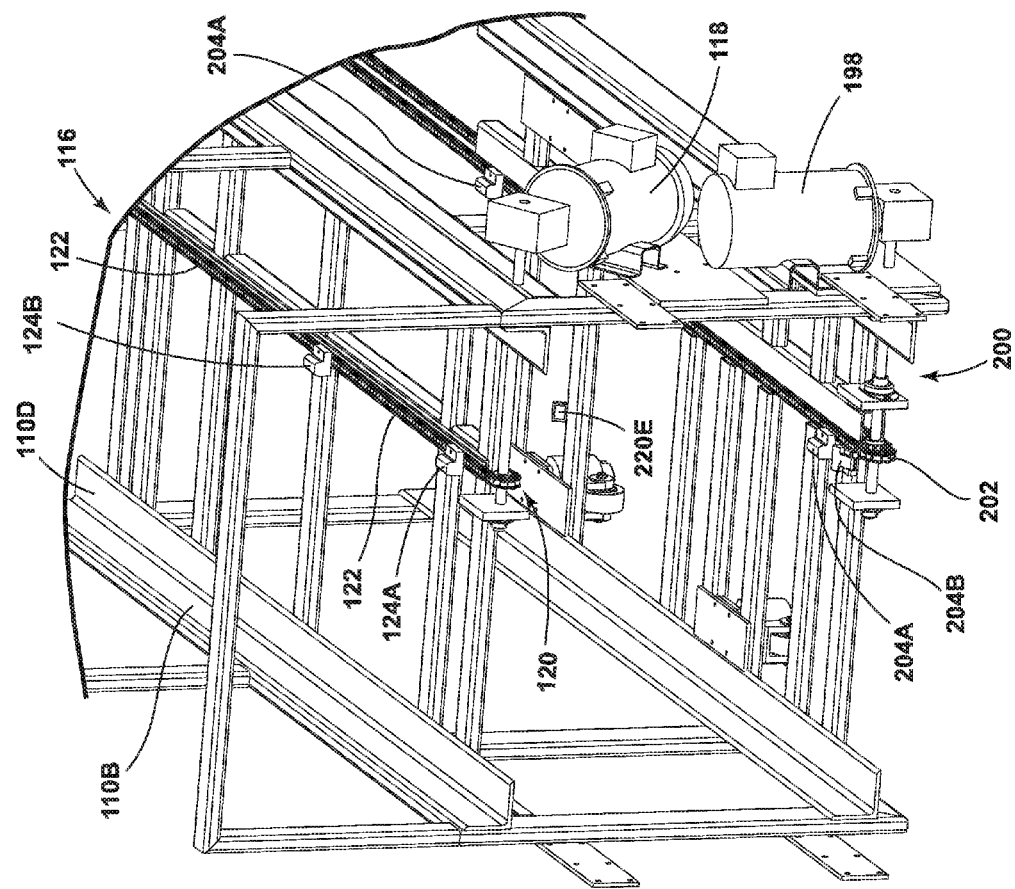
Figure 4D:
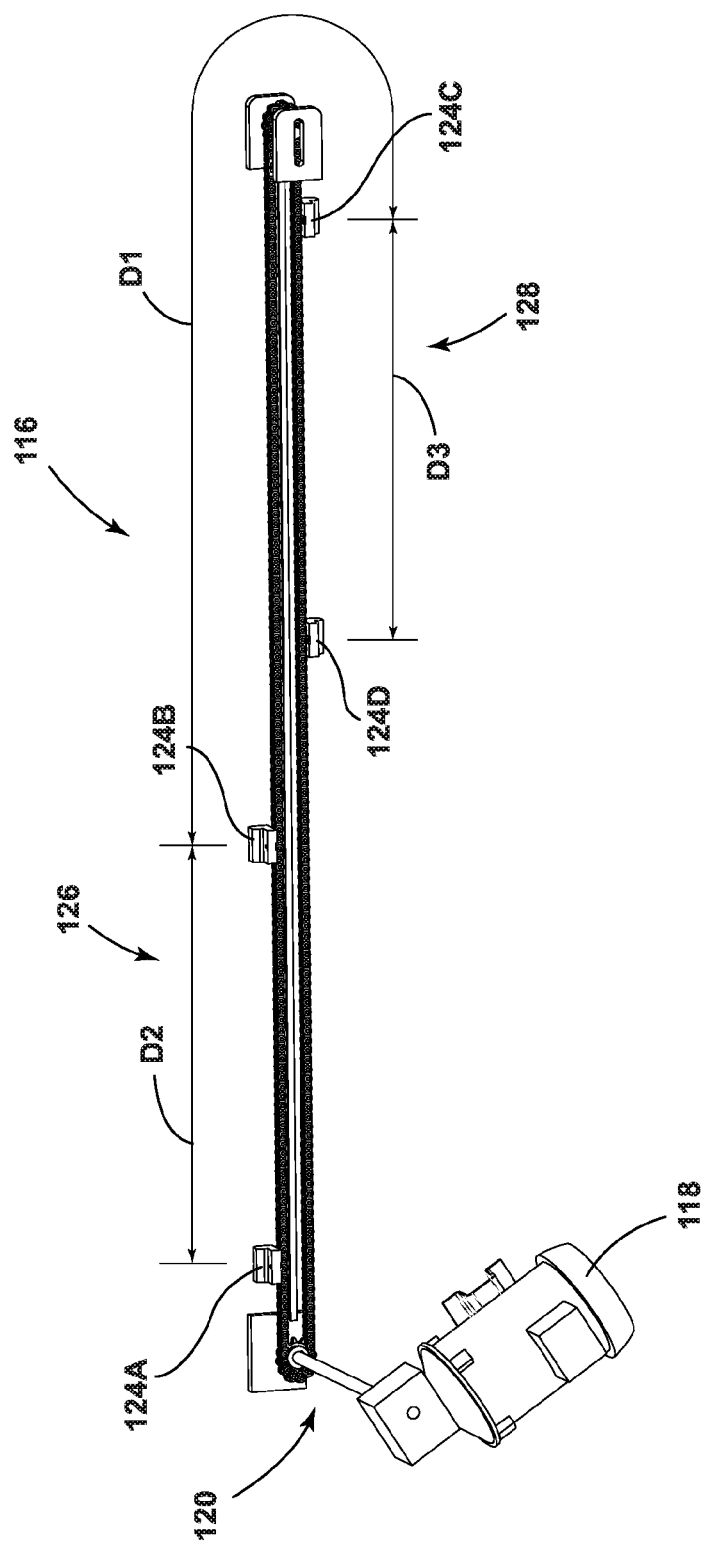
Figure 6:
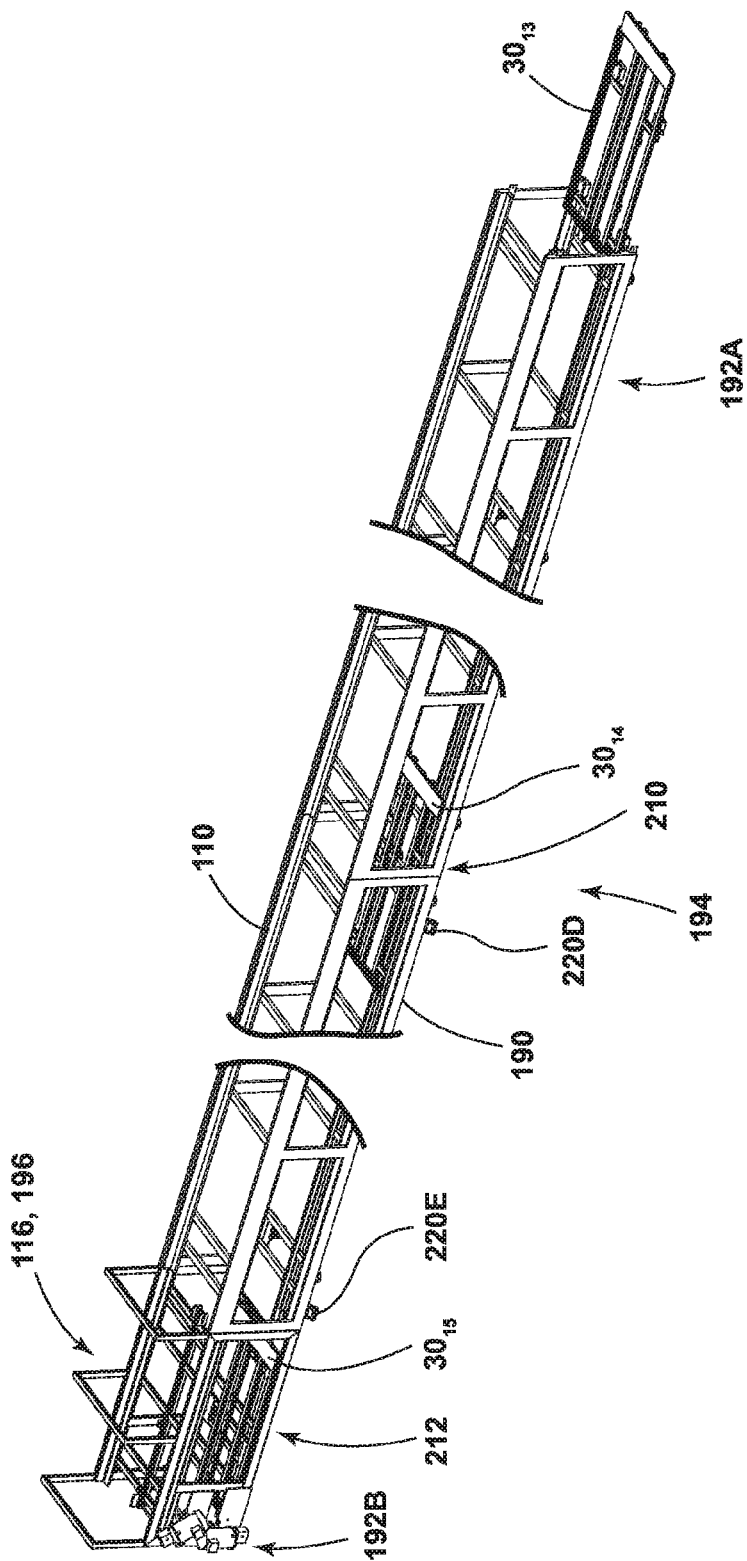
FIG. 6 is a perspective view generally illustrating portions of an upper track, a lower track, pallets, and an upper track drive system, in accordance with embodiments of the present disclosure.

In embodiments, lower track 190 may include, for example, sensors 220D, 220E (see, e.g., FIGS. 4C and 6). Sensor 220D may be configured to sense whether a pallet 30$_N$ is present at or near first resting position 210 and/or sensor 220E may be configured to sense whether a pallet 30$_N$ is present at or near second resting position 212.

Figure 5B:
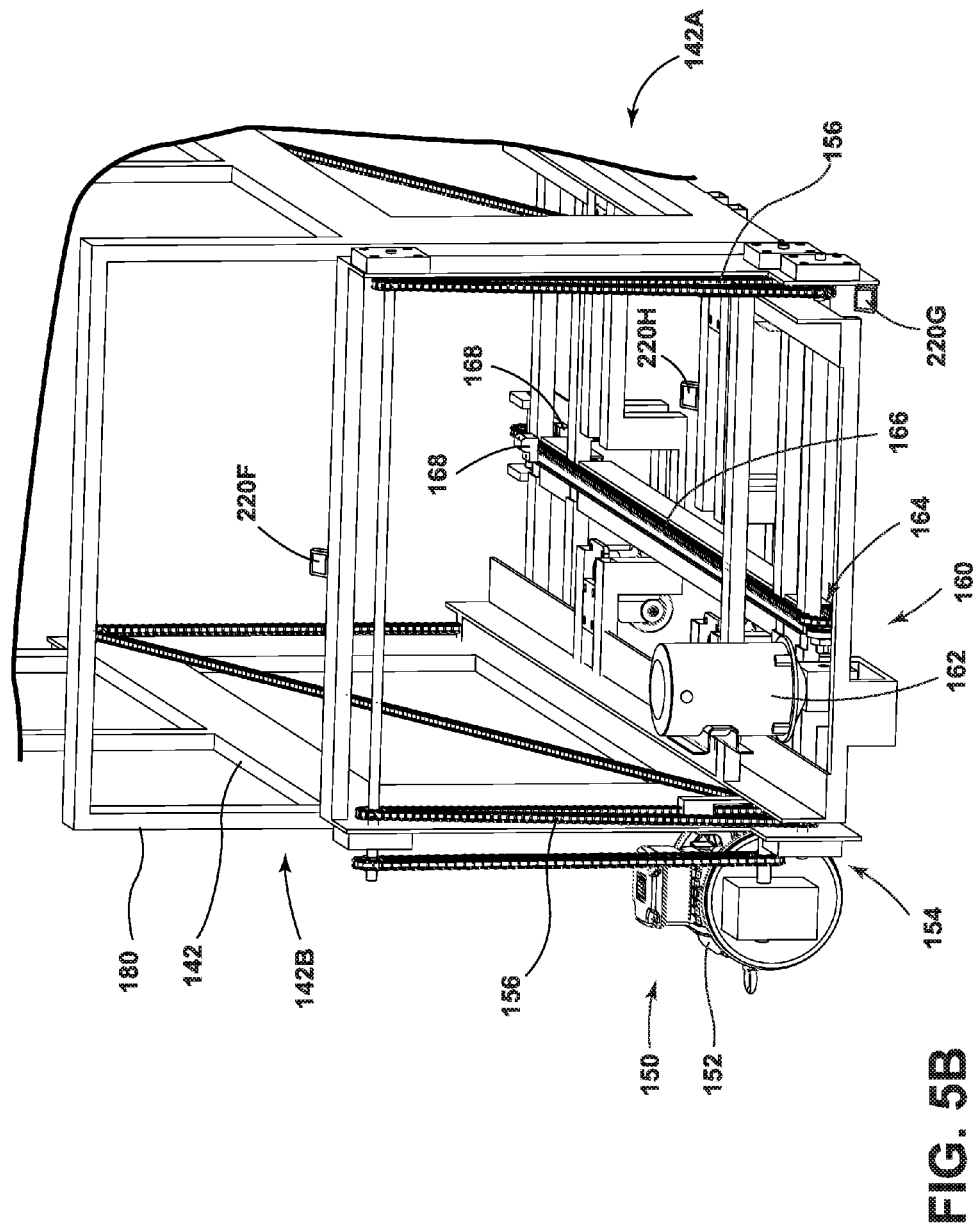
Figure 5C:
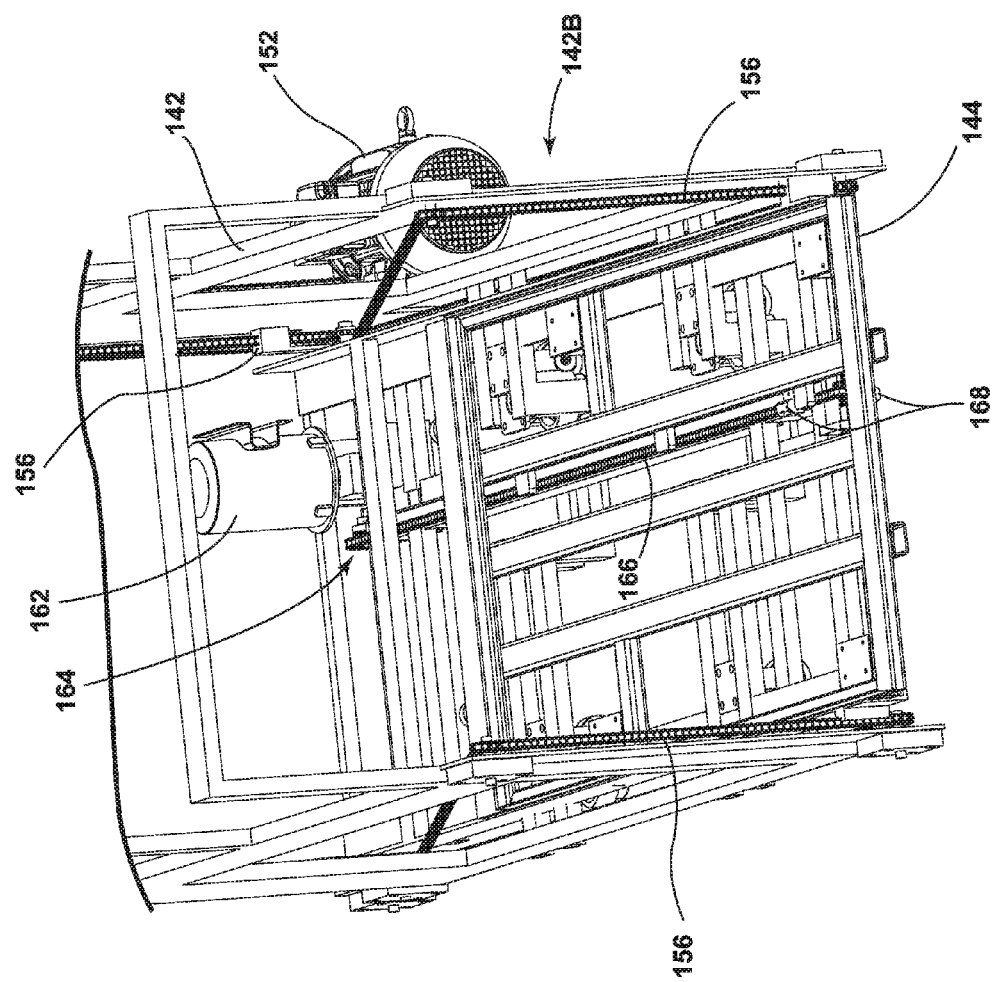

In embodiments, second pallet elevator 140 may include, for example, sensors 220F, 220G, 220H (see, e.g., FIGS. 5A and 5B). Sensor 220F may be configured to sense whether pallet cart 144 is in proximity to sensor 220F (e.g., whether cart 144 is in a raised position). Sensor 220G may be configured to sense whether pallet cart 144 is in proximity to sensor 220G (e.g., whether pallet cart 144 is in a lowered position). Sensor 220H may be configured to sense whether a pallet 30$_N$ is present in pallet cart 144 (e.g., whether a pallet 30$_N$ is completely on/in pallet cart 144).

In embodiments, controller 20 may be configured to control assembly line 10 according to signals and/or data that controller 20 may receive from sensors 220. For example, and without limitation, controller 20 may cause pallet car 144 of second pallet elevator 140 to lower only if a sensor (e.g., sensor 220H) indicates that a pallet 30$_N$ has been completely received by pallet cart 144 (e.g., the pallet 30$_N$ is not still partially on upper track 110). In embodiments, controller 20 may be configured to control lower track 190 such that lower track drive system 196 only begins to operate if sensors (e.g., sensors 220B, 220G) indicate that both of first pallet elevator 70 and second pallet elevator 140 are in lowered positions. While controller 20 may not begin to operate lower track 190 unless both of first pallet elevator 70 and second pallet elevator 140 are in lowered positions, controller 20 may continue to operate lower track drive system 196 after one or both of first pallet elevator 70 and second pallet elevator 140 leave their lowered positions. For example, and without limitation, once a pallet 30$_N$ has exited second pallet elevator 140, controller 20 may cause pallet cart 144 to begin to return to its raised position and controller 20 may continue operate lower track 190 to drive the pallet 30$_N$ to first resting position (e.g., lower track 190 may continue to operate even after pallet cart 144 leaves its lowered position). In embodiments, once a pallet 30$_N$ has been received by pallet cart 74 of first pallet elevator 70, controller 20 may cause pallet cart 74 to begin to return to its raised position and controller 20 may continue to operate lower track 190 to drive a pallet 30$_N$ from the first resting position 210 to the second resting position 212.

In embodiments, one or more of first pallet elevator 70, upper track drive system 116, second pallet elevator 140, and/or lower track drive system 196 may be configured to operate independently from each other. For example, and without limitation, operation and/or activation of first pallet elevator 70, upper track drive system 116, second pallet elevator 140, and/or lower track drive system 196 may not require operation and/or activation of any other system/component (e.g., assembly line 10 may not rely on a single drive chain). In embodiments, assembly line 10 may include a modular configuration, which may permit first pallet elevator 70, upper track 110, second pallet elevator 140, and lower track 190 to be selectively connected to each other. Such a modular configuration may be permitted, for example, by the independence of first pallet elevator 70, upper track drive system 116, second pallet elevator 140, and lower track drive system 196. In embodiments, pallets 30$_N$ may translate along assembly line 10, but may not rotate and/or flip over.

In embodiments, a method of operating assembly line 10 may comprise providing assembly line with first pallet elevator 70, upper track 110, second pallet elevator 140, and/or lower track 190. The method may include providing a plurality of pallets 30$_N$. A first set of the plurality of pallets 30$_N$ disposed on the upper track (e.g., pallets 30$_1$-30$_{12}$) and a second set of the plurality of pallets 30$_N$ disposed the lower track (e.g., pallets 30$_{14}$, 30$_{15}$). In embodiments, the method may include driving, via upper track drive system 116, the first set of pallets at a constant speed. In embodiments, the method may include driving, via lower track drive system 196, the second set of pallets according to positions of the first pallet elevator 70 and the second pallet elevator 140. For example, and without limitation, lower track drive system 196 may begin to operate if one or more sensors (e.g., sensors 220B, 220G) indicate that pallet carts 74, 144 of first and second pallet elevators 70, 140 are in lowered positions.

In embodiments, the second set of pallets $30_N$ may include two pallets. In embodiments, driving the second set of pallets $30_N$ may include driving the second set of pallets $30_N$ at a lower track speed, and the lower track speed may be greater than the speed (e.g., the constant speed) of upper track drive system 116.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. It should also be understood that references to a spring are not limited to a particular type of spring and may include, without limitation, any type of biasing member and/or material. It should be understood that references to a chain or a gear and chain arrangement are not limited to a particular arrangement, and may include, for example, various force transmission components, such as chains, belts, cables, gears, gear racks, magnets, and/or others. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. An assembly line, comprising:
   a first pallet elevator;
   a second pallet elevator;
   an upper track configured to transport a plurality of pallets between the first pallet elevator and the second pallet elevator, the plurality of pallets including a first set of pallets and a second set of pallets;
   a lower track disposed below the upper track, the lower track configured to transport the plurality of pallets between the second pallet elevator and the first pallet elevator;
   a lower track drive system disposed between the first pallet elevator and the second pallet elevator, the lower track drive system configured to engage the first set of the pallets;
   an upper track drive system configured to engage at least one pallet of the second set of pallets and to drive a remainder of the second set of the pallets via the at least one pallet; and
   wherein the first pallet elevator is configured to transport the plurality of pallets between the lower track and the upper track, the second pallet elevator is configured to transport the plurality of pallets between the upper track to the lower track, and the lower track drive system is independent of the upper track drive system
   wherein each pallet of the plurality of pallets includes a plurality of flanges comprising a front flange, a middle flange, and a rear flange; the lower track drive system includes a drive chain extending from the first pallet elevator to the second pallet elevator; the lower track drive system includes a plurality of drive dogs fixed to the drive chain and configured to engage the front flange and the rear flange of each pallet; and the plurality of drive dogs of the lower track drive system includes a first set of drive dogs, the first set of drive dogs including a fixed dog and a deflecting dog.

2. The assembly line of claim 1, wherein the upper track drive system is configured to continuously move the second set of pallets while the lower track drive system intermittently moves the first set of pallets.

3. The assembly line of claim 2, wherein the first set of pallets includes a first pallet and a second pallet, and the lower track drive system is configured to simultaneously engage the first pallet and the second pallet.

4. The assembly line of claim 3, wherein the lower track includes a first end connected to the first pallet elevator, a second end connected to the second pallet elevator, and a middle section disposed between the first end and the second end; and, wherein the first pallet is disposed at or near the second end of the lower track and the second pallet is disposed at or near the middle section of the lower track.

5. The assembly line of claim 1, wherein each of the plurality flanges is disposed on an underside of the plurality of pallets.

6. The assembly line of claim 5, wherein the upper track drive system includes a plurality of drive dogs configured to engage the middle flange and the front flange of each pallet.

7. The assembly line of claim 6, wherein the plurality of drive dogs includes a first pair of drive dogs fixed to a drive chain and a second pair of drive dogs fixed to the drive chain.

8. The assembly line of claim 1, wherein at least one pallet of the first set of pallets comprises a first section configured for assembly of a first product and a second section configured for assembly of a second product.

9. The assembly line of claim 1, wherein the deflecting dog is configured to deflect under the plurality of flanges in a first direction and is configured to limit movement of the plurality of flanges in a second direction.

10. The assembly line of claim 1, wherein each pallet of the plurality of pallets comprises a buffer region.

11. A method of moving pallets, the method comprising;
providing an assembly line comprising
   a first pallet elevator,
   a second pallet elevator,
   an upper track, and
   a lower track,
providing a first set of pallets disposed on the upper track and a second set pallets disposed on the lower track;
moving, substantially continuously via an upper track drive system, the first set of pallets at a substantially constant speed; and
moving, intermittently via a lower track drive system, the second set of pallets according to positions of the first pallet elevator and the second pallet elevator.

12. The method of claim 11, wherein the second set of pallets includes two pallets.

13. The method of claim 11, wherein moving the second set of pallets includes moving the second set of pallets at a lower track speed, and the lower track speed is greater than the constant speed.

14. The method of claim 13, wherein intermittently moving the second set of pallets includes not beginning to move the second set of pallets if either of the first pallet elevator and the second pallet elevator are not in a lowered position.

15. The method of claim 11, wherein the lower track drive system includes a deflecting dog and a fixed dog.

16. The method of claim 15, wherein each pallet of the first set of pallets and the second set of pallets includes a plurality of flanges configured for engagement with at least one of the deflecting dog and the fixed dog.

17. The method of claim 11, wherein each pallet of the first set of pallets and the second set of pallets includes a buffer region, and a length of the buffer region corresponds to a desired increased operation time.

* * * * *